United States Patent [19]

Bhattacharjee et al.

[11] Patent Number: 5,041,497

[45] Date of Patent: Aug. 20, 1991

[54] PROCESS FOR PREPARING CO POLY(AMIDES/PEPTIDES)

[75] Inventors: Himangshu R. Bhattacharjee, Randolph; Jon I. Williams, Robbinsville; Michael D. Swerdloff, Princeton; Morris B. Berenbaum, Summit, all of N.J.

[73] Assignee: Allied-Signal Inc., Morris Township, Morris County, N.J.

[21] Appl. No.: 335,243

[22] Filed: Apr. 10, 1989

[51] Int. Cl.$^5$ .................. C08F 283/00; C08J 3/02; C08G 69/14

[52] U.S. Cl. .................. 525/54.11; 524/17; 524/704; 528/325

[58] Field of Search .............. 524/17, 704; 525/54.11; 528/325

[56] References Cited

U.S. PATENT DOCUMENTS

| | | | |
|---|---|---|---|
| 2,892,817 | 6/1959 | Ham | 528/325 |
| 3,509,107 | 4/1970 | Brignac | 528/487 |
| 3,551,548 | 12/1970 | Brignac et al. | 528/339 |
| 3,763,113 | 10/1973 | Barrows et al. | 525/420 |
| 4,390,667 | 6/1983 | Aharoni et al. | 524/144 |
| 4,417,031 | 11/1983 | Aharoni et al. | 525/425 |
| 4,417,032 | 11/1983 | Khanna et al. | 524/147 |

FOREIGN PATENT DOCUMENTS 575760 5/1959 Canada ........................ 528/325
569184 5/1945 United Kingdom .

OTHER PUBLICATIONS

N. Nishi et al., Polymerization of Amino Acids or Peptides with Diphenyl Phosphorylazide (DPPA) Int. J. Biol. Macromol., p. 53, vol. 2, 1980.

J. of the American Chemical Society, 94, pp. 6203–6205 (1972) T. Shiori et al., "Diphenylphosphoryl Azide. A New Convenient Reagent for a Modified ...".

"Optimization of Hydroxylation of Tyrosine and Tyrosine-Containing Peptides by Mushroom Tyrosinase", K. Marumo et al., Biochimica of Biophysica Acta 872, pp. 98–103 (1986).

Primary Examiner—Thurman K. Page
Assistant Examiner—G. S. Kishore
Attorney, Agent, or Firm—Darryl L. Webster; Richard C. Stewart

[57] ABSTRACT

A process for preparing a co-poly(amide/peptide) by reacting polymeric or oligomeric polypeptides and polymeric or oligomeric polyamides in the presence of an effective amount of one or more aryl phosphoryl azide compounds.

43 Claims, No Drawings

PROCESS FOR PREPARING CO POLY(AMIDES/PEPTIDES)

BACKGROUND OF THE INVENTION

1. Field of the Invention

This invention relates to a process for preparing copolymers. More particularly, this invention relates to a process for preparing a copoly(amide/peptide). Copolymers prepared in accordance with the process of this invention have many uses. For example, these copolymers can be used as biodegradable polymers and can be fabricated into useful shaped articles of manufacture, e.g., filaments, both mono-and multifilament, films, tapes, ribbons, rods, laminates, and the like.

2. Description of the Prior Art

Polymer compositions are disclosed in the prior art as having many and varied uses in industrial and commercial applications. For example, these polymers can be formed into filaments in which the polymer chains are oriented along the filament axis. Such filaments have many uses, in commercial applications, as for example, in the production of fibers for tire cord, textiles and the like. Similarly, these polymers can be fabricated into other useful shaped articles, as for example, films, gears, lawn mower housings, skate boards and the like, through use of conventional molding and fabrication techniques.

The utility of a particular polymer for a particular application is very much dependent on the physical properties of the polymer. For example, polymers having increased molecular weights form fibers and molded articles having superior properties. Fibers and molded articles made from such polymers have increased tensile strength, durability and impact resistance. Accordingly, processes for increasing the molecular weight of various polymers are valuable procedures in tailoring such polymers for optimization of such properties.

Similarly, various functional groups and polymer side chains, as well as the structural conformation of certain polymers, are factors which affect the physical characteristics of polymers and thus are also critical to the utility of these polymers. Thus, procedures for varying and controlling these function groups, side chains and structural conformations are also valuable tools in tailoring polymers for specific uses and as such are valuable tools to those of skill in the polymer art.

Certain conventional processes are used to form block, graft or quasi random copolymers of polyamides, or of polyamides and other polymer such as polyesters For example, U.S. Pat. No. 4,417,032 discloses a process for forming quasi-random copolymers from two or more homo polyamides. In this process, the homo polyamides are melt blended in the presence of a phosphite promoter Various copolyamides are also described in U.S. Pat. No. 2,892,817.

U.S. Pat. No. 3,509,107 discloses a process for increasing the relative viscosity of polyamide fibers or copolyamides by incorporating a phosphorous or phosphite compound into the polyamide under an inert gas atmosphere. The primary object of U.S. Pat. No. 3,509,107 is to provide a process for increasing the viscosity of polyamide fibers or copolyamides by incorporating a phosphorous or phosphite compound into the polyamide under an inert gas atmosphere. Another object of U.S. Pat. No. 3,509,107 is to provide a process for increasing the viscosity of polyamide yarn and cord which requires a minimum amount of gas. U.S. Pat. No. 3,551,548 (Brignac, et al., 1970) describes various optimizing procedures for U.S. Pat. No. 3,509,107. The described patents are each directed only to a method of producing polyamide yarn with increased viscosity via incorporating a phosphorous or phosphite compound into the yarn, and then heating said yarn in the presence of inert gas.

British Patent No. 569,184 discloses a method for producing a random copolymer from nylon 6 and nylon 6,6. The invention described herein teaches that heating a mixture of nylon 6 and nylon 6,6 results in interchange between various sections of the respective polymer molecules with the final product being a random copolymer of nylon 6 and nylon 6,6. In order to produce a random copolymer of nylon 6 and nylon 6,6, British Patent No. 569,184 teaches that it is necessary to heat the mixture of homopolymers for periods of time up to 8 hours at 285,C without any catalyst.

U.S. Pat. No. 4,390,667 discloses a process for decreasing the melt index and increasing the viscosity of polyamide fibers via incorporating a phosphate compound into the polyamide and heating the polyamide until the desired changes in the melt index and viscosity occur. The phosphate utilized in U.S. Pat. No. 4,390,667 includes substituted aryl phosphates which satisfy certain Hammett sigma values.

U.S. Pat. No. 4,417,031 discloses a process for preparing block and graft copolymers. The described process involves reacting two or more polyamides, polyesters, and homopolymers of β-unsaturated carboxylic acids in order to form a graft and/or block copolymer. Included in the patent are copolymers formed from poly(caproamide) and poly(hexamethylene adipamide).

Diphenyl phosphoryl azide has been used as a convenient reagent for racemization-free peptide synthesis and for polymerization of peptides and amino acids such as β-alanine and L-alanylglycine. See for example, Norio Nishi et al. "Polymerization of Amino acids or Peptides with Diphenyl Phosphoryl Azide (DPPA)", Int. J. Biol. Macromol., Vol. 2, p. 53 (1980) and Takayuki Shiori et al., "Diphenylphosphoryl Azide. A New Convenient Reagent for a Modified Curtius Reaction and for the Peptide Synthesis", *J. of the American Chemical Society*, Vol. 94, p. 6203–6205 (1972).

BRIEF DESCRIPTION OF THE INVENTION

In accordance with this invention, there is provided a process for forming a "co-poly(amide/peptide)" which comprises reacting two or more reactants at least one of which is a "polymeric polyamide", an "oligomeric polyamide" or a "polyamide precursor" and at least one of which is a "polymeric polypeptide" or an "oligomeric polypeptide" or a "polypeptide precursor" in the presence of an effective amount of one or more aryl phosphoryl azide compounds of the formula.

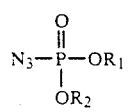

wherein:
$R_1$ is selected from the group consisting of phenyl and phenyl substituted with one or more substituents, such as phenyl, phenoxy, phenylalkyl, alkoxyalkyl, alkylphenyl, alkoxyphenyl, alkyl, alkoxy, nitro, halo and the like, which are inert under the process conditions; and $R_2$ is selected from the group consisting of $R_1$ substituents, hydrogen, alkyl, nitroalkyl, haloalkyl and metal or non-metal cations.

As used herein, a "co-poly(amide/peptide)" is a copolymer having carbonamide, and peptide recurring units. The arrangement of various types of recurring monomeric units in the copolymer may vary widely. For example, the copolymer may be a random, block, random/block or graft copolymer, but are preferably block copolymers.

As used herein, a "polyamide precursor" is either an aromatic or aliphatic diacid and an aromatic or aliphatic diamine, or an amino acid or a derivative thereof such as a lactam or a salt of an amino acid.

As used herein, an "oligomeric polyamide" is a polyamide having from about 2 to about 100 carbonamide units and as used herein a "polymeric polyamide" is a polyamide having more than about 100 carbonamide units As used herein, a "polypeptide precursor" is an amino acid selected from the group consisting of naturally occurring amino acids such as alanine, arginine, aspargine, aspartic acid, cysteine, cystine, glutamic acid, glutamine, glycine, histidine, hydroxylysine, hydroxyproline, isoleucine, leucine, lysine, methionine, phenylalanine, proline, serine, threonine, thyroxine, tryptophane, tyrosine, valine and non-naturally occurring alpha amino carboxylic acids such as 2-amino butanoic acid, 2-amino propanoic acid, 2-amino pentanoic acid, 2-amino octanoic acid and the like.

As used herein, an "oligomeric polypeptide" is a polypeptide derived from naturally occurring and non-naturally occurring amino acids having from 2 to about 200 recurring peptide units and a "polymeric polypeptide" is a polypeptide having more than about 200 recurring peptide units.

Through use of the process of this invention, copolymers having new and useful properties can be made. For example, conventional polyamides such as nylon 6 and nylon 6,6 in polymeric or oligomeric form can be modified with polypeptide blocks to form biodegradable polymers for medical, agricultural and ecological uses, or polymers which combine the properties of synthetic polyamides and the properties of naturally occurring polypeptides, as for example silk, elastin, keratin, collagen and the like. Through use of the process of this invention, various physical properties of polymers such as tensile strength, hydrophilicity, elasticity, hydrophobicity, melting point, adhesiveness, processing characteristics and like properties also can be tailored to suit a particular application.

DESCRIPTION OF THE PREFERRED EMBODIMENT

In the process of this invention, two or more materials, at least one of which is a polymeric polyamide, an oligomeric polyamide or a polyamide precursor and at least one of which is a polymeric polypeptide, an oligomeric polypeptide or a polypeptide precursor are reacted neat or in a suitable organic solvent in the presence of an effective amount of one or more aryl phosphoryl azide compounds. As used herein, a "suitable organic solvent" is any organic solvent which does not react with the reactants under the reaction conditions of the process. Illustrative of useful solvents are aprotic solvents such as dimethylsulfoxide, dimethyl acetamide and dimethyl formamide, useful solvents also include nonpolar solvents as for example aliphatic and cycloaliphatic hydrocarbons, such as hexane, cyclohexane, heptane, cyclopentane, pentane, isooctane, and the like; aromatic solvents such as benzene, toluene, xylene and the like; and halohydrocarbons such as carbon tetrachloride, methylene dichloride, chlorofluoromethane, dichlorodifluoroethane, trichlorotrifluoroethane, chloroform, and the like. Preferred non-polar organic solvents for use in the practice of this invention are fluorohydrocarbon solvents, hydrocarbon solvents and aprotic solvents, and particularly preferred for use in the process are aprotic solvents such as dimethyl sulfoxide, dimethyl formamide, dimethyl acetamide, and the like.

The amount of solvent is not critical and may vary widely. Usually, the amount of solvent will vary from about 5 to about 200 percent by weight based on the total weight of the reactants. The preferred amount of solvent is from about 50 to about 100 weight percent of the reactants. Greater amounts of solvent can of course be used, except such amounts merely dilute the components of the reaction mass with no particular advantage being obtained.

Aryl phosphoryl azide compounds for use in the practice of this invention are aryl substituted azide compounds of the formula:

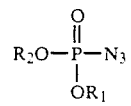

wherein $R_1$ and $R_2$ are as described above. Illustrative of useful compounds are those in which $R_1$ is an aryl substituent such as phenyl or substituted phenyl such as 2-aminophenyl, 3-aminophenyl, 2-benzyloxyphenyl, 3-benzyloxyphenyl, 4-benzyloxyphenyl, 2-bromophenyl, 3-bromo-5-chlorophenyl, 3-bromo-2, 4-dinitrophenyl, 5-bromo-2-nitrophenyl, 2-butoxyphenyl, 3-chlorophenyl, 4-chloro-2, 3-di-nitrophenyl, 2,4-dibromophenyl, 2,6-dichlorophenyl, 2,4-diiodophenyl, 3,5-dimethoxyphenyl, 2-ethoxyphenyl, 4-ethoxyphenyl, 2,5-dinitrophenyl, 4-heptyloxyphenyl, 4-hexyloxyphenyl, 4-methyoxyphenyl, 4-methoxy-2-nitrophenyl, 4-octyloxyphenyl, 4-propoxyphenyl, 2,3,5-trichlorophenyl,2,3,5-triiodophenyl, 4-isobutylphenyl, 4-isopropyl-1-methylphenyl, 2-methoxy-4-propenylphenyl, 4-methyl-1,3,5-chlorophenyl, 4-pentylphenyl, 2-propylphenyl, 2,3,5,6-tetramethylphenyl, 3,5-di-tert-butylphenyl, 4-tert-butylphenyl, 3-isopropylphenyl, 2,4-dimethylphenyl, 2-methylcarbonylphenyl and the like. The $R_2$ substituents can vary widely and include those cited for $R_1$ and also alkyl and substituted alkyl groups such as tert-butyl, sec-butyl, n-butyl isopropyl, hexyl, 2-nitropropyl, neopentyl, pentyl, sec-pentyl, ethyl, 2-chloroethyl and the like. Metal salts of the phosphoryl azide such as sodium, potassium, zinc, lithium, calcium, barium, magnesium, aluminum, lanthanum and other metal salts and/or ammonium phosphoryl azide compounds in which $R_2$ is a cation are also illustrative of useful compounds.

Preferred for use in the practice of this invention are aryl phosphoryl azide compounds in which $R_1$ and $R_2$ are the same or different and are phenyl or substituted phenyl. In the particularly preferred embodiments of the invention, $R_1$ and $R_2$ are the same or different and are phenyl or phenyl substituted with one or more nitro, phenoxy, halo, phenyl, alkylphenyl, phenylalkyl, alkyl, alkoxyalkyl, alkoxyphenyl or alkoxy groups. Amongst these particularly preferred embodiments, most preferred are those embodiments in which $R_1$ and $R_2$ are the same and are phenyl, phenyl substituted with one or more alkyl, phenyl, phenylalkyl or alkoxy groups, with diphenyl phosphoryl azide being the aryl phosphoryl azide compound of choice.

An effective amount of one or more aryl phosphoryl azide compounds is employed in the conduct of the process of this invention. As used herein, "an effective amount" is an amount of the aryl phosphoryl azide compounds which when added to appropriate reactants forms the desired amount of the desired copolymer. In general, the amount of aryl phosphoryl azide compound employed will vary depending on the amount and type of reactants employed, reaction temperatures, the use of a solvent or the lack thereof and the like. Usually, the amount of phosphoryl azide compound employed when the reaction is conducted neat is at least about 0.05 weight percent based on the total weight of the reactants. In the preferred embodiments of this invention, the quantity of the aryl phosphoryl azide compound employed when the reaction is conducted neat is at least about 0.10 weight percent to about 10 weight percent, based on the total weight of the reactants. In the particularly preferred embodiments of this invention, the weight percent of aryl phosphoryl azide compound when the process is conducted neat is in the range of from 0.20 to about 5.0 weight percent based on the total weight of reactants. Amongst these particularly preferred embodiments most preferred are those in which the quantity of aryl phosphoryl azide compound employed when the process is conducted neat is from about 0.4 to about 2.0 weight percent based on the total weight of the reactants. An amount of aryl phosphoryl azide compound of from about 0.5 to about 1.0 weight percent based on the total weight of the reactants is the quantity of choice, when the reaction is conducted neat.

The amount of aryl phosphoryl azide compound employed when the reaction is run in solution is at least 10 weight percent based on the total weight of the reactants. In the preferred embodiments of this invention, the quantity of the one or more aryl phosphoryl azide compound employed when the reaction is conducted in solution is about 10 weight percent to about 200 weight percent, based on the total weight of the reactants. In the particularly preferred embodiments of this invention, the weight percent aryl phosphoryl azide compound when the reaction is conducted in solution is in the range of from 20 to about 150 weight percent, based on the total weight of the reactants. Amongst these particularly preferred embodiments, when the reaction is conducted in solution most preferred are those in which the quantity of aryl phosphoryl azide compound employed is from about 40 to about 150 weight percent based on the total weight of the reactants. An amount of aryl phosphoryl azide compound of from about 100 to about 150 weight percent based on the total weight of the reactants is the quantity of choice when the reaction is conducted in solution.

Reactants for incorporation of the carbonamide recurring units into the copolymers are selected from the group consisting of polyamide precursors, polymeric polyamides and oligomeric polyamides. Illustrative of useful polyamide precursors which may be used in the process of this invention are either an aromatic or aliphatic diacid and an aromatic or aliphatic diamine or an amino acid or a derivative therof such as a lactam. The particular diacid, diamine or amino acid used in any situation will vary depending on the desired polyamide. Illustrative of useful diacids and diamines are hexamethylenediamine, 2,2,2- trimethylhexamethylene, piperazine, p-aminoaniline, m-aminoaniline, decamethylenediamine. octamethylene- diamine, heptamethylenediamine, nonamethylenediamine, 1,4-diaminocyclohexane, 1,4-(aminomethyl)benzene, 1,3-(aminomethyl)benzene, suberic acid, adipic acid, pimelic acid, azelaic acid, sebacic acid, succinic acid, phthalic acid, isophthalic acid, terephthalic acid, glutaric acid and the like. Useful amino acids include 4-aminobutyric acid, 6-aminohexanoic acid, 7-aminoheptanoic, 8-aminooctanoic acid, 9-aminononanoic acid, 10-aminodecanoic acid, 11-aminoundecanoic acid, 12-aminododecanoic acid and the salts, lactam or other derivatives of the above acids.

The preferred amino acid polyamide precursor is 6-aminohexanoic acid, and the preferred diamino and diacid polyamide precursors are hexamethylenediamine and adipic acid.

Illustrative of useful oligomeric and polymeric polyamides are those formed by polymerization of a diacid and a diamine and can be composed of a single type of repeating monomeric unit or more than one type of repeating monomeric unit. These useful oligomeric and polymeric polyamides have recurring units represented by the general formula:

in which R is an alkylene group of at least about two carbon atoms or arylene having at least about six carbon atoms, preferably alkylene having from about 2 to about 10 carbon atoms or substituted or unsubstituted phenylene, and $R^1$ is R or aryl. Exemplary of such materials are poly(hexamethylene adipamide) (nylon 6,6) poly(hexamethylene sebacamide) (nylon 6,10), poly(hexamethylene isophthalamide), poly(hexamethylene terephthalamide), poly(heptamethylene pimelamide) (nylon 7,7), poly(octamethylene suberamide) (nylon 8,8), poly(nonamethylene azelamide) (nylon 9,9), poly (decamethylene azelamide) (nylon 10,9), poly(decamethylene sebacamide) (nylon 10,10), poly- bis(4-amino cyclohexyl)methane-1,10-decanecarboxamide) (Quiana), poly(m-xylylene adipamide), poly(p-xylylene sebacamide), poly(2,2,2-trimethyl hexamethylene terephthalamide), poly(piperazine sebacamide), poly(p-phenylene terephthalamide), poly(metaphenylene isophthalamide) and the like.

Other useful oligomeric and polymeric polyamides are those formed by polymerization of amino acids and derivatives thereof, as for example lactams Illustrative of these useful oligomeric and polymeric polyamides are poly(4-aminobutyric acid) (nylon 4), poly(6-aminohexanoic acid) (nylon 6), poly(7-aminoheptanoic acid) (nylon 7), poly(8-aminoocatanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like.

Preferred oligomeric or polymeric polyamides for use in the practice of this invention are polycaprolactam and poly(hexamethylene adipamide). The most preferred oligomeric or polymeric polyamide is polycaprolactam.

Useful oligomeric and polymeric polypeptides, and polypeptide precursors may vary widely Illustrative of useful polypeptide precursors natural are amino acids such as alanine, arginine, asparagine, aspartic acid, cysteine, cystine, glycine, proline, hydroxyproline, histidine, isoleucine, leucine, lysine, ornithine, phenylalanine, serine, valine, tyrosine and the like. Illustrative of still other useful polypeptide precursors are non-natural alpha amino carboxylic acids such as 2-amino butanoic acid, 2-amino propanoic acid, 2-amino pentanoic acid, 2-amino octanoic acid and the like. Useful oligomeric and polymeric polypeptides may be homopolymers or copolymers. For example, such oligomeric and polymeric polypeptides may include homopolymers such as poly(L-lysine), poly(L-tyrosine), random copolymers such as poly(L-Ala, L-Glu, L-lys HBr), sequential or block copolymers such as poly(Pro-Gly-Pro), poly(Val-Pro-Gly-Val-Gly), poly(Lys-Pro-Ser-Tyr-4Hyp-4Hyp-Thr-Tyr-Lys-Ala) and the like.

Illustrative of other useful and preferred oligomeric and polymeric polypeptides are naturally occurring materials or their synthetic analogs. For example, useful oligomeric and polymeric polypeptides include naturally-occurring fibrous or film forming proteins such as collagen, elastin, insect salivary gland silk protein, silk fibroin, troponin C, tropomyosin, and the like and their synthetic analogs such as poly(Gly-Pro-Pro)$_n$, poly(Pro-Gly-Pro)$_n$, poly(Pro-Pro-Gly)$_n$, poly(Val-Pro-Gly-Val-Gly)$_n$, poly(Gly-Ala-Gly-Ala-Gly-Ser)$_n$ and the like where n is an integer of from about 2 to about 200, and preferably from about 15 to about 100. Such materials can be used in the manufacture of copolymers for use in fibers and films.

Similarly, useful oligomeric and polymeric polypeptides include naturally-occurring adhesives such as insect salivary gland adhesive protein, bioadhesive proteins from marine crustaceans such as *Mytilis edulis, M. californianus,* and *Geukensia demissa,* trematode egg shell dopa proteins, and the like and their synthetic analogs. These materials can be used in the manufacture of adhesives. Likewise, useful oligomeric and polymeric polypeptides include naturally-occurring architectural proteins such as egg shell proteins, keratin, insect cuticle proteins, and the like, and their synthetic analogs. These materials can be used in the fabrication of structural parts.

Illustrative of still other useful and preferred synthetic oligomeric, and polymeric polypeptides are:
poly-(Ala-Lys-Pro-Ser-Tyr-Pro-Pro-Thr-Tyr-Lys)$_n$;
poly-(Ala-Lys-Pro-Ser-Tyr-4-Hyp-4-Hyp-Thr-Tyr-Lys)$_n$;
poly-(Ala-Lys-Pro-Ser-Tyr-4-Hyp-4-Hyp-Thr-Tyr-Lys)$_n$;
poly-(Ala-Lys-Pro-Ser-Phe-4-Hyp-4-Hyp-Thr-Tyr-Lys)$_n$;
poly-(Ala-Pro-Ser-Tyr-4-Hyp-4Hyp-Thr-Tyr-Lys)$_n$;
poly-(Ala-Lys-Pro-Ser-Tyr-4-Hyp-4-Hyp-Thr-Tyr-Lys)$_n$;
poly-(Ala-Lys-Pro-Ser-Tyr-Pro-Pro-Thr-Tyr-Lys)$_n$;
poly-(Lys-Pro-Ser-Tyr-4Hyp-4Hyp-Thr-Tyr-Lys-Ala)$_n$;
poly-(Ala-Lys-Pro/Hyp-Ser/Thr-Tyr/Dopa-Pro/-Hyp-Ser/Thr-Tyr/Dopa-Lys)$_n$;
poly-(Gly-X-Y)$_n$;
poly-(Gly-Pro-X)$_n$;
poly-(Gly-X-Pro)$_n$;
poly-(X-Pro-Gly-Y-Gly)$_n$;
poly-(X-Pro-Gly-Gly)$_n$;
poly-(X-Pro-Gly-Val-Gly-Y)$_n$;
poly-((Ala)$_4$-(Lys)-(Ala)$_2$-Lys$_2$-(Phe/Tyr)-Gly-Ala)$_n$;
poly (Ala-Gly)$_n$;
poly-((Ala)$_2$-Lys-(Ala)$_3$-Lys-(Ala$_2$))$_n$;
poly-(Gly-Ala-Gly-Ala-Gly-Ser)$_n$;
poly-(Ala-Lys-Pro-Ser-Try-Pro-Pro-Thr-Tyr-Lys)$_n$;
poly-(Pro-Leu-Gly)$_n$;
poly-(Ala-Gly-Gly);
poly-(Val -Pro-Gly-Val-Gly)$_n$
poly-(Ser-Gly-Gly)$_n$;
poly-(Pro-Phe-Gly)$_n$;
poly-(Pro-Lys-Gly)$_n$;
poly-(Lys-Gly-Gly)$_n$;
poly-(Pro-Gly-Gly)$_n$;
poly-(Pro-Pro-Gly)$_n$;
poly-(Ala-Phe-Gly)$_n$;
poly-(Lys-Glu-Gly)$_n$;
poly-(Ala-Gly-Gly-Gly)$_n$;
poly-(Pro-Leu-Gly-Gly)$_n$;
poly-(Pro-Gly-Pro Gly)$_n$;
poly-(Lys-Glu-Lys-Glu)$_n$;
where the amino acids are listed by standard three letter code, "Hyp" is hydroxyproline, "4-Hyp" is 4-hydroxyproline, "Dopa" is 3,4-dihydroxyphenyl alanine, n is equal to or greater than 1, preferably from 1 to about 1000, more preferably from 1 to about 500 and most preferably from 1 to about 150, and X and Y are the same or different and each is a natural or non-natural amino acid and the nomenclature ,X/Y, indicates that either X or Y can be present in the copolymer chain at the sequential position indicated.

Particularly preferred oligomeric and polymeric polypeptides are sequential naturally occurring polypeptides and synthetic analogs. These polypeptides exhibit a variety of useful properties when incorporated in copolymers containing polyamide portions. For example, such polypeptides impart enhanced fibrousness, adhesiveness, biodegradability, elasticity, tensile strength, and hydrophobicity to the copolymer. One illustrative example of this invention may involve the use of diphenyl phosphoryl azide to separately prepolymerize the precursor of nylon 6,e- amino caproic acid, and a dipeptide such as L-alanylglycine to generate a copolymer useful as an artificial silk.

In the preferred embodiments of the invention the oligomeric and polymeric includes one or more recurring monomeric units derived from lysine and/or glycine. In these preferred embodiments the remaining recurring monomeric units can be derived from any of the other amino acids. In the particularly preferred embodiments of the invention, the oligomeric and polymeric polypeptide will also include one or more recurring units derived from tyrosine or other hydroxy substituted amino acids such as hydroxyproline, hydroxylysine and the like.

In further preferred embodiments, the pendant group of monomeric unit derived from tyrosine is hydroxylated. Preferably, the phenyl group is hydroxylated enzymatically. The enzymatic hydroxylation can be carried out by conventional means. See, for example, K. Marumo et al., "Optimization of hydroxylation of tyrosine and tyrosine-containing peptides by mushroom tyrinase", Biochimica et Biophsica Acta. 872, pp. 98–103 (1986).

The molecular weight of the oligomeric and polymeric polypeptides and oligomeric and polymeric polyamides may vary widely. For example, the oligomeric and polymeric polypeptides and polyamide may vary from oligomers having 2 or more repeat units to molecular weights up to about 100,000, and higher. In the preferred embodiments of the invention, oligomeric polypeptides and oligomeric polyamides are used. In the particularly preferred embodiments of the invention oligomeric polyamides and oligomeric polypeptides having from about 2 to about 50 repeat units are employed, and in particularly preferred embodiments of the invention oligomeric polyamides and polypeptides having from about 3 to about 20 repeat units are employed. Amongst these particularly preferred embodiments of the invention most preferred are those in which the oligomeric polypeptide or oligomeric polyamide includes from about 3 to about 15 repeat units.

The amount of polyamides and polypeptides used may vary widely depending on the relative amount of recurring units in the copolymer and the desired properties of the copolymer. In general, the material present in the greater amount will comprise the greater amount of the recurring units in the copolymer. In the preferred embodiments of the invention, an amount of polyamide precursor, polymeric polyamide and/or oligomeric polyamide is used which is sufficient to provide a copolymer where from about 30 to about 95 percent (based on total moles recurring units) of the recurring units of the copolymer are polyamide based. In the particularly preferred embodiments of the invention, the relative amount of polyamide and polypeptide producing reactants employed is such that the amount of polyamide based recurring units in the final copolymer is from about 50 to about 95 percent based on the total recurring units in the copolymer.

The solution process is carried out in the presence of a base. The nature of the base may vary widely. Illustrative of useful bases are organic bases for example, tertiary and secondary amines such as pyridine, piperidine, N,N'-dimethyl piperidine, triethanol amine, N-methylmorpholine, triethylamine, trimethylamine, tributylamine, and alkali metal alkoxides such as sodium methoxide and sodium ethoxide. Useful bases also include inorganic bases as for example alkali metal and alkaline earth metal hydroxides such as sodium hydroxide, calcium hydroxide, potassium hydroxide and lithium hydroxide. Preferred bases are organic bases, and particularly preferred bases are tertiary amines. Most preferred amines are tertiary amines such as triethylamine, tributylamine, trimethylamine and N-methyl morpholine.

The amount of base employed may vary widely. In general, the amount of base used is from about 50 to about 500 weight percent based on the total weight of the polymer reactants. If the amount of the base is too small, the catalytic effects is insufficient. On the other hand, if the amount of base is too large, the reaction mass solidifies such that the reaction loses all practical meaning. In the preferred embodiments of the invention, the amount of base is from about 50 to about 200 weight percent based on the total weight of reactants, and in the particularly preferred embodiments of the invention the amount of base employed is from about 100 to about 150 weight percent on the aforementioned basis.

The reaction temperatures may vary widely, and can vary from the freezing point of the reaction mixture up to the temperature at which product and reactants become susceptible to decomposition depending on whether the reaction is conducted neat or in solution. In general, for a particular situation the reaction temperature will depend on whether the reaction is conducted neat or in solution. Generally, lower reaction temperatures are employed in solution reactions while generally higher reaction temperatures are employed in neat reactions. In the preferred embodiments of the invention where the reaction is carried out neat, reaction temperatures may vary from about 100° C. to about 350° C., and in the particularly preferred embodiments of this invention where the reaction is carried out neat, reaction temperatures may vary from about 150° C. to about 300° C. Amongst these particularly preferred embodiments, most preferred are those embodiments where the reaction is carried out neat in which the reaction temperature varies from about 175° C. to about 215° C. In the preferred embodiments of the invention, where the reaction is carried out in solution, reaction temperatures may vary from about 0° C. to about 100° C., and in the particularly preferred embodiments of this invention where the reaction is carried out in solution, reaction temperatures may vary from about 5° C. to about 50° C. Amongst these particularly preferred embodiments, most preferred are those embodiments where the reaction is carried out in solution in which the reaction temperature varies from about 15° C. to about 30° C.

Similarly, process pressures are not critical and can be varied widely without adversely affecting the process. Consequently, the process can be conducted at sub-atmospheric, atmospheric or super-atmospheric pressures. However, for convenience the process is carried out at atmospheric or autogenous pressure.

The process is carried out for a time sufficient to form the desired copolymers. Reaction times can be varied over a wide range. Usually, reaction times will depend on a variety of factors such as whether the reaction is conducted neat or in solution, the polymeric components, reaction temperatures, the azide compound and its concentration, and other factors known to those of skill in the art to affect reaction times. In most instances, the reaction time can vary from a few minutes to several days or more. In the preferred embodiments of this invention, reaction times will vary from about 1 hr to about sixty days, and in the particularly preferred embodiments from about 24 hrs. to about 30 days i.e. to about 14 days when conducted in solution and at room temperature.

Best results are obtained when the process of this invention is carried out in the presence of as little water as possible. Ideally, the conditions will be anhydrous, and this represents the most preferred embodiment of the invention. However, good results can be obtained when as much as 0.165 weight percent water based on the total weight of the mixture is present therein. In the preferred embodiments, the weight percent of water is less than about 0.1 weight percent, and in the particularly preferred embodiments, the weight percent of water is less than about 0.05 weight percent on the same basis.

The process is carried out until the reactants have condensed to provide a co-poly(amide/peptide) of desired molecular weight. The molecular weight of the co-poly(amide/peptide) may vary widely and depends on the desired properties of the co-(poly(amide/peptide) and the intended uses. Usually, the molecular weight of the co-poly(amide/peptide) is at least about 5,000. In the preferred embodiments of the invention, the molecular weight of the co-poly(amide/peptide) is from about 5,000 to about 200,000, and in the particularly preferred embodiments of invention the molecular weight of the co-poly(amide/peptide) is from about 10,000 to about 50,000. Amongst these particularly preferred embodiments, most preferred are those embodiments in which the molecular weight of the co-poly(amide/peptide) is from about 20,000 to about 100,000.

The process of this invention can be conducted in a batch, semicontinuous or continuous fashion. The reactants and reagents may be initially introduced into the reaction zone batchwise or they may be continuously or intermittently introduced in such zone during the course of the process. Means to introduce the quantity of reactants introduced, either intermittently or continuously into the reaction zone during the course of the reaction can be conveniently utilized in the process especially to maintain the desired molar ratio of the reaction solvent, reactants and reagents. The reaction can be conducted in a single reaction zone or in a plurality of reaction zones, in series or in parallel or it may be conducted intermittently or continuously in an elongated tubular zone or series of such zones. The materials of construction employed should be inert to the reactants during the reaction and the fabrication of the equipment should be able to withstand the reaction temperatures and pressure.

The reaction zone can be fitted with one or more internal and/or external heat exchanger(s) in order to control undue temperature fluctuations, or to prevent any possible "runaway" reaction temperatures. In preferred embodiments of the process, agitation means to vary the degree of mixing the reactions mixture can be employed. Mixing by vibration, shaking, stirring, rotation, oscillation, ultrasonic vibration or the like are all illustrative of the type of agitation means contemplated. Such means are available and well known to those skilled in the art.

After the reaction, the resulting co-poly(amide/peptide) can be recovered by use of conventional recovery techniques such as precipitation, extraction, distillation, recrystallization, chromotography and the like. For example, in the case of a water insoluble co-poly(amide/peptide) chloroform can be added to the reaction mixture followed by addition of ethyl ether, which precipitates the co-poly(amide/peptide) which can be collected by filtration. The co-poly(amide/peptide) can then be washed sequentially with water, and acetone or methanol followed by recrystallization in dichloroacetic acid, hexafluoroisopropanol, dimethylformamide or trifluroethanol. The crystallized co-poly(amide/peptide) can then be recrystallized from ethyl ether, washed sequentially with water and acetone or methanol and dried to provide the purified product. In the case of water soluble co-poly(amide/peptide) the crude product can be purified by dialysis using cellophane film or the like.

Co-poly(amide/peptide) prepared by the process of this invention may vary widely. For example, the co-poly(amide/peptide) may contain blocks of synthetic analogs to naturally-occurring fibrous or film proteins such as collagen, elastin, insect salivary gland silk protein, silk fibroin, troponin C, tropomyosin, and the like and blocks of polyamides such as nylon 6, nylon 4, nylon 66 and the like. Such a co-poly(amide/peptide) may be used in the manufacture of fibrous products or films, or used for medical purposes, such as artificial skin, burn coatings, a base for medicines or for cosmetics, and as biodegradable films. The co-poly(amide/peptide) may contain blocks of synthetic analogs of naturally-occurring adhesives such as insect salivary gland adhesive protein, bioadhesive proteins from marine crustaceans such as *Mytilis edulis*, *M. californianus*, or *Geukensia demissa*, trematode egg shell dopa proteins, and the like and blocks of polyamides such as nylon 6 and nylon 66. Such a co-poly(amide/peptide) can be used in the manufacture of materials which are inherently adhesive. Likewise, the process can be used in the preparation of a co-poly(amide/peptide) which contains blocks of synthetic analogs to naturally-occurring architectural proteins such as egg shell proteins, keratin, insect cuticle proteins, and the like and which also contains blocks of nylons such as nylon 6 and nylon 66 which can be used in the fabrication of structural parts.

The co-polymers prepared by the process of this invention may be random or block copolymers. In the preferred embodiments of the invention, the copolymers are block copolymers comprising one or more "A" blocks formed of peptide units and one or more "B" blocks formed of amide units. Each "A" block and each "B" block may be the same or different. As used herein, the term "block" means a sequence of one type of monomeric unit at least about 5 monomeric units long, or such sequence of two or more types of recurring monomeric units either randomly distributed in such a sequence or distributed such sequence in a block-like fashion. Each "A" block and "B" block may comprise a single type of recurring monomeric unit. Alternatively, each block may comprise more than one type of recurring monomeric unit, randomly distributed throughout each block. For example, the block copolymers as described above may have repeating block units such as AB, ABA, BAB, ABAB, ABABA, BABAB, and the like, where each "A" block and each "B" block contains the same or substantially the same types of recurring monomeric unit, and/or where each block contains the same or substantially the same number of recurring units. Alternatively, the various "A" and "B" blocks contained in the block copolymers may have more than one type of "A" block or "B" block, each of which may contain a different type or types of recurring monomeric units; or each block may contain the same or different types of recurring units but have differing number of recurring units in each block. With respect to the recurring blocks of A's and B's, each of them may also be the same or different. For example, ABABA may in fact be MNOPQ, ABA may be MNQ or ABA may be MNOPQ, where M, N, O, P and Q are the same or different provided that at least one of M, N, O, P and Q is composed of recurring peptide units and at least one of M, N, O, P and Q is composed of recurring amide units. Especially preferred are block copolymers of structures AB and ABA, with ABA being the most preferred.

The relative proportions of polypeptide blocks and polyamide blocks in the copolymer may vary widely depending on the desired properties of the copolymer. For example, the mole percent of either of the polypeptide blocks or polyamide blocks can vary from less than about 1 mole percent to greater than about 99 mole percent based on the total moles recurring monomeric units in the polymer where it is desired that the polymer exhibit more polypeptide properties the greater the mole percent of polypeptide blocks in the polymer. Conversely, where it is desired that the polymers exhibit more polyamide properties, the greater the mole percent of polyamide blocks in the polymer. Thus, by modifying the mole percent of polypeptide blocks and polyamide blocks and the type of polypeptide and polyamide blocks the properties of the polymer can be tailored as desired.

The following examples are included to demonstrate the advantages of the process of this invention and the different properties of the co-poly(amide/peptide) prepared thereby and do not represent any limitations on the scope of the invention.

EXAMPLE 1

Into a flask was placed 2 g (15 mmol) of ε-amino caproic acid (Aldrich) in 2 ml of dimethyl sulfoxide (DMSO). To the stirred solution was then added 4 ml (18 mmol) of diphenyl phosphoryl azide (DPPA) (Aldrich) and 5 ml (36 mol) of HPLC grade triethylamine (Fisher). The reaction was allowed to run at room temperature for 24 hrs. The solution appeared viscous after that period indicating the formation of oligomers of ε-amino caproic acid. ("(ε-amino caproic acid)$_n$").

EXAMPLE 2

Oligomers of the dipeptide L-alanylglycine (Ala-Gly) were synthesized by mixing 500 mg (3.5mmol) of L-alanylglycine in 1 ml of dimethyl sulfoxide and then adding to the mixture with stirring 1ml (4.5 mmol) of diphenylphosphoryl azide (DPPA) and 1.25 ml (9.0 mmol) of HPLC grade triethylamine. The reaction was allowed to run for 24 hours at room temperature to form oligomers of (Ala-Gly) ("Ala-Gly)$_n$").

EXAMPLE 3

Aliquots of the reaction solutions from Example 1 and Example 2 were mixed together (50:50) in a separate flask. The mixture was stirred at room temperature for 72 hours. To facilitate the comparative study of the poly(Ala-Gly), (poly(ε-amino caproic acid) and co-poly((Ala-Gly)$_n$(ε-amino caproic acid)$_n$) each of the solutions of Example 1 and 2 were also stirred at room temperature for a total of 72 hrs. to form poly(Ala-Gly) and poly(ε-amino caproic acid).

Poly (Ala-Gly), poly(ε-amino caproic acid) and the copolymer copoly((Ala-Gly)$_n$(-amino caproic acid)$_n$) were precipitated by the addition of 25 ml of water to each reaction flask. The precipitated materials were then collected by filtration and washed with water (3 times), ethanol (3 times) and ether (1 time). Treatment with water removed the monomers having free carboxylic acid and amino end groups. The solids were dried in vacuo and were characterized by differential scanning calorimetry (DSC).

In the DSC studies, a Dupont 9900 thermal analyzer with a DSC cell in argon atmosphere was used. A sample of about 15 mg was crimped in an aluminum pan and heated at 10° C./min. After initial heat-up, the sample was held at 250° C. for 5 minutes prior to either programmed cooling (1.0° C./min) or quenching in liquid nitrogen. A subsequent reheat was carried out under the same condition as the initial heat-up.

DSC results indicated a melting temperature ($T_m$) value for poly(ε-amino caproic acid) of 177°–178° C. Upon quenching from the molten state, a glass transition ($T_g$) of approximately 6° C., a cold crystallization temperature ($T_ch$) of approximately 47° C. and a melting temperature ($T_m$) of 170° C. were observed.

DSC analysis of poly(Ala-Gly) showed no definite melting point, a result which is typical of polypeptides. By contrast, DSC analysis, of co-poly((Al-Gly)$_n$(ε-amino caproic acid)$_n$) indicated that the copolymer had a melting temperature ($T_m$) of 175° C.

EXAMPLE 4

Using the procedure of Examples 1, 2 and 3, a co-poly(decapeptide/(ε-amino caproic acid)$_n$) was prepared. The decapeptide was synthesized utilizing Merrifield's Solid phase peptide synthesis technique on an Applied Biosystems Model 430A peptide synthesizer. The structure of the decapeptide (GLUE-12) synthesized is as follows:

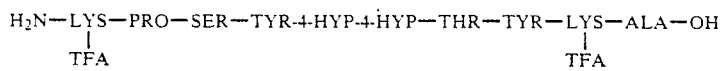

The ε-amino group of the lysines are blocked by trifluoroacetemide (TFA) groups to facilitate linear polymerization without branchings. To form the oligomeric polypeptide of the decapeptide ("(decapeptide)"$_n$) the 200 mg of the decapeptide in 0.3 ml of dimethyl sulfoxide (DMSO) was mixed with 0.25 ml of diphenyl phosphoryl azide (DPPA) and 0.3 ml of triethylamine. The mixture was stirred for 2 hrs. at 0° C., and for 24 hrs. at room temperature.

Using the procedure of Example 3, the co-poly((decapeptide)$_n$(ε-amino caproic acid)$_n$ was prepared by mixing a solution of oligomeric decapeptide with a solution of (ε-amino caproic acid)$_n$ (prepared as in Example 1) for a total of 11 days at room temperature. One reaction mixture containing the oligomeric (decapeptide)$_n$ and another reaction mixture containing the oligomeric (ε-amino caproic acid)$_n$ were also run for 11 days at room temperature to prepare poly(ε-amino caproic acid) and the poly(decapeptide) for comparison purposes. Each reaction mixture was poured into 25 ml of ether. A precipitate formed which was separated from the bulk of the solution and treated with deionized water. The resulting white solids were collected by filtration, washed several times sequentially with water, ethanol and ether. The solids were dried in vacuo for 2 days at room temperature. For the poly(decapeptide) reaction mixture, the initial treatment with ether apparently dissolved a portion of the precipitated poly(decapeptide). However, addition of water to the ether wash resulted in the precipitation of additional poly(decapeptide) which was purified by using the same procedure as described above. More than 60% yield was obtained in each case.

Poly(ε-amino caproic acid), poly(decapeptide) and poly((decapeptide)$_n$(ε-amino caproic acid)$_n$) were characterized by DSC studies using the procedure of Example 3. DSC analysis indicated that poly(ε-amino caproic acid) had a $T_g$ of 14° C. and a $T_m$ of 182° C. As expected, the polydecapeptide did not show any definite $T_m$ value. The co-poly (ε-amino caproic acid)$_n$ (decapeptide)$_n$) had a $T_g$ of approximately 37° C., a $T_ch$ of approximately 108° C. and a $T_m$ of approximately 172° C. after second reheat. Estimation by GC on the hydrolized samples revealed that ε-amino content of the copolymer was approximately 65%.

The molecular weight of poly(decapeptide) was determined by ninhydrin procedures used for determining free NH2 groups. Initially, ninhydrin color development of a preweighted amount of the decapeptide was monitored at 570 nm. From the absorbance data, the micromoles of amines/g of decapeptide was determined to be 752 with a calculated molecular weight for the decapeptide of 1399 daltons. Identical procedures followed for the color monitoring of particular batch of polydecapeptide polymerized for 6 days showed micromoles of free amines/g of the polymer to be equal to 30. From these data, the number average molecular weight (Mn) was calculated to be about 25,000 after 6 days polymerization. Similarly after 11 days of polymerization of the decapeptide, the Mn was found to be 40,000.

EXAMPLE 5

Using the procedures of Examples 1, 2, 3 and 4, another co-poly((decapeptide)$_n$($\epsilon$-amino caproic acid) was prepared. The structure of the decapeptide is as follows

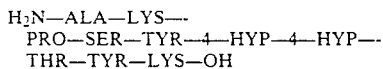
PRO—SER—TYR—4—HYP—4—HYP—
THR—TYR—LYS—OH

The oligomeric polypeptide of this decapeptide, (decapeptide)$_n$, was prepared by forming a mixture of 200 mg of the decapeptide in 0.3 ml of dimethyl sulfoxide (DMSO), 0.25 ml of diphenyl phosphoryl azide (DPPA) and 0 to 3 ml of triethylamine. The reaction mixture was stirred for 2 hrs. at 0,C and for 24 hrs. at room temperature. As in Example 3, the co-poly((-decapeptide)$_n$($\epsilon$-amino caproic acid)$_n$) was prepared by mixing a solution of the oligomeric decapeptide and a solution of the oligomeric ($\epsilon$-amino caproic acid; ($\epsilon$-amino caproic acid)$_n$) prepared as in Example 1. The mixture was stirred for 19 days at room temperature. For comparison purposes, the poly(decapeptide) and poly($\epsilon$-amino caproic acid)$_n$ nylon 6 were prepared by stirring solutions of each of the oligomeric decapeptide and oligomeric ($\epsilon$-amino caproic acid) for 19 days at room temperature. The poly(decapeptide), poly($\epsilon$-amino caproic acid) and co-poly((decapeptide)$_n$($\epsilon$-amino caproic acid)$_n$) were recovered from the reaction solutions and purified using the procedure of Example 4.

A ninhydrin assay performed on the poly(decapeptide) gave a polymerization number of 7. Such a low polymerization number is not surprising if the chemistry of the polymerization is considered. Since the two lysines in each decapeptide are not blocked by TFA at the $\epsilon$-amino positions, polymer extensive branchings are quite possible during carbonamide bond formation. This should lead to a relatively low polymerization number when determined by the end group analysis, even though a very high molecular weight polymer is produced.

What is claimed is:

1. A process for preparing co-poly(amide/peptide) which comprises reacting two or more reactants at least one of which is a polymeric polyamide, an oligomeric polyamide and at least one of which is a polymeric polypeptide, an oligomeric polypeptide in the presence of at least one aryl phosphoryl azide compound of the formula:

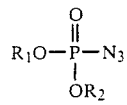

wherein:
  R$_1$ is selected from the group consisting of phenyl or phenyl substituted with one or more substituents which are inert under process conditions; and
  R$_2$ is selected from the group consisting of alkyl, haloalkyl, nitroalkyl, hydrogen, a metal or nonmetal cation or R$_1$ substituents said azide compound being present in an amount effective for polymerization.

2. A process according to claim 1 wherein at least one of each reactants is an oligomeric polyamide and at least one of said reactants is an oligomeric polypeptide.

3. A process according to claim 2 wherein said oligomeric polyamide and said oligomeric polypeptide are selected from the group consisting of materials having from 2 to about 50 repeat units.

4. A process according to claim 3 wherein said oligomeric polyamide and said oligomeric polypeptide are selected from the group consisting of materials having from 2 to about 20 repeat units.

5. A process according to claim 4 wherein said oligomeric polyamide and said oligomeric polypeptide are selected from the group consisting of materials having from 2 to about 15 repeat units.

6. A process according to claim 2 wherein of said oligomeric polyamide are selected from the group consisting of oligomeric polycaprolactam and oligomeric poly(hexamethylene adipamide).

7. A process according to claim 6 wherein said oligomeric polyamide is oligomeric polycaprolactam.

8. The process of claim 2 wherein said oligomeric polypeptides are selected from the group consisting of materials comprising at least one monomeric unit derived from glycine or lysine.

9. The process of claim 8 wherein said oligomeric polypeptide comprises at least one monomeric unit derived from tyrosine.

10. The process of claim 9 wherein said oligomeric polypeptide comprises at least one monomeric unit derived from hydroxyproline.

11. The process of claim 2 wherein said oligomeric polypeptides are selected from the group consisting of:
poly-Ala-Lys-Pro-Ser-Tyr-Pro-Pro-Thr-Tyr-Lys $_n$,
poly-Al-Lys-Pro-Ser-Tyr-4-Hyp-4-Thr-Thr-Tyr-Lys $_n$,
poly-Ala-Lys-Pro-Ser-Tyr-4-Hyp-4-Hyp-Thr-Tyr-Lys $_n$,
poly-Ala-Lys-Pro-Ser-Pho-4-Hyp-4-Hyp-Thr-Tyr-Lys $_n$,
poly-Ala-Pro-Ser-Tyr-4-Hyp-4-Hyp-Thr-Tyr-Lys $_n$,
poly-Ala-Lys-Pro-Ser-Tyr-4-Hyp-4-Hyp-Thr-Tyr-Lys $_n$,
poly-Ala-Lys-Pro-Ser-Tyr-Pro-Pro-Thr-Tyr-Lys -$_n$,
poly-Lys-Pro-Ser-Tyr-4Hyp-4Hyp-Thr-Tyr-Lys-Ala -$_n$,
Ala-Lys-Pro/Hyr-Ser/Thr-Tyr/Dopa    Pro/Hyp Ser/Thr-Tyr/Dopa-Lys$_n$,
poly-Gly-X-Y$_n$,
poly-Gly-Pro-X$_n$,
poly-Gly-X-Pro$_n$,
poly-X-Pro-Gly-Y-Gly$_n$,
poly-X-Pro-Gly-Gly$_n$, poly-X-Pro-Gly-Val-Gly-Y,
poly-(Ala)$_4$-(Lys)-(Ala)$_2$-Lys$_2$-(Phe/Tyr)-Gly-Ala$_n$,
poly-(Ala)$_2$-Lys-(Ala)$_3$-Lys-(Ala$_2$)$_n$,
poly-Gly-Ala-Gly-Ala-Gly-Ser $_n$,
poly-Ala-Lys-Pro-Ser-Try-Pro-Pro-Thr-Tyr-Lys$_n$,
poly-Pro-Leu-Gly $_n$,
poly-Ala-Gly-Gly,
poly-Ser-Gly-Gly$_n$,
poly-Pro-Phe-Gly$_n$,
poly-Pro-Lys-Gly$_n$,
poly-Lys-Gly-Gly$_n$,
poly-Pro-Gly-Gly$_n$,
poly-Pro-Pro-Gly$_n$,
poly-Ala-Phe-Gly$_n$,
poly-Lys-Glu-Gly$_n$,
poly-Ala-Gly-Gly-GLY$_n$,
poly-Pro-Leu-Gly-Gly$_n$,
poly-Pro-Gly-Pro-Gly$_n$,
poly-Lys-Glu-Lys-Glu$_n$,
poly-Val-Pro-Gly-Val-Gly$_n$ and
poly-Ala-Lys-Pro-Ser-tyr-4-Hyp-Thr-Phe-Lys$_n$
wherein n is equal to or greater than 1 and X and Y are the same or different at each occurrence and each is an amino acid.

12. A process according to claim 7 which further comprises hydroxylating the pendant phenyl group of the monomeric unit derived from tyrosine.

13. A process according to claim 12 wherein said phenyl group is hydroxylated enzymatically.

14. A process according to claim 1 wherein said process is carried out neat.

15. A process according to claim 14 wherein said process is carried out at a temperature of al least about 150,C.

16. A process according to claim 15 wherein said temperature is from about 170,C. to about 350,C.

17. A process according to claim 1 wherein said process is carried out in an aprotic solvent.

18. A process according to claim 17 wherein said process is carried out at a temperature of from about 0,C. to about 100,C.

19. A process according claim 18 wherein said process is carried out at a temperature of from about 5,C. to about 50,C.

20: A process according to claim 19 wherein said process is carried out at a temperature of from about 20,C. to about 30,C.

21. A process according to claim 1 wherein R$_1$ and R$_2$ are the same or different and are phenyl or substituted phenyl.

22. A process according to claim 21 wherein R$_1$ and R$_2$ are the same or different and are phenyl or phenyl substituted with one or more alkyl, halo, nitro, phenyl, phenoxy, alkylphenyl, alkoxyphenyl, phenylalkyl or alkoxy groups.

23. A process according to claim 10 wherein R$_1$ and R$_2$ are the same or different and are phenyl or phenyl substituted with one or more phenyl, alkyl, alkoxy or phenylalkyl groups.

24. A process according to claim 11 wherein R$_1$ and R$_2$ are the same or different and are phenyl or phenyl substituted with one or more alkyl or alkoxy groups.

25. A process according to claim 1 wherein said aryl phosphoryl azide compound is diphenyl phosphoryl azide.

26. A process according to claim 1 wherein said mixture is heated in the absence or substantial absence of water.

27. A process according to claim 26 wherein the amount of water in said mixture is less than about 0.1 weight percent based on the total weight of the mixture.

28. A process according to claim 14 wherein the amount of aryl phosphoryl azide compound is at least about 0.1 percent by weight of the mixture.

29. A process according to claim 28 wherein said amount is from about 0.1 to about 10 weight percent by weight.

30. A process according to claim 29 wherein said amount is from about 0.2 to about 5 percent by weight.

31. A process according to claim 30 wherein said amount is from about 0.2 to about 2 percent by weight.

32. A process according to claim 17 wherein the amount of aryl phosphoryl azide compound is at least about 10 weight percent based on the total weight of the reactants.

33. A process according to claim 32 wherein said amount is from about 10 to about 200 weight percent.

34. A process according to claim 33 wherein said amount is from about 20 to about 150 weight percent.

35. A process according to claim 1 wherein said process is carried out in solution.

36. A process for preparing co-poly(amide/peptide) which comprises reacting two or more reactants at least one of which is a polymeric polyamide, an oligomeric polyamide and at least one of which is a polymeric polypeptide, an oligomeric polypeptide in the presence of at least one aryl phosphoryl azide compound of the formula:

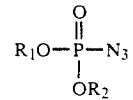

wherein:
R$_1$ is selected from the group consisting of phenyl or phenyl substituted with one or more substituents which are inert under process conditions; and
R$_2$ is selected from the group consisting of alkyl, haloalkyl, nitroalkyl, hydrogen, a metal or nonmetal cation or R$_1$ substituents, said co poly(amide/peptide) having a reduced melting point over co-poly(amide/peptide)s of the same molecular weight formed by the copolymerization of at least a polymeric polyamide, an oligomeric polyamide and at least one polymeric peptide, an oligomeric polypeptide in the presence at least one of said diphenyl phosphoryl azide compounds, in an amount effective for polymerization said melting points being measured by a Differential Scanning Colorimetry (DSC) at a heating rate of about 10° C./min. under argon.

37. A process in accordance with claim 1 wherein said co poly(amide/peptide) has a molecular weight ranging from about 10,000 to about 200,000.

38. A process in accordance with claim 1 wherein said co poly(amide/peptide) has a molecular weight ranging from about 20,000 to about 100,000.

39. In an improved process for forming a shaped article of co poly(amide/peptide) which comprises:

heating a co poly(amide/peptide) to a temperature at least equal to the melting temperature for said co poly(amide/peptide);

b) shaping said co poly(amide/peptide) into a predetermined configuration, while maintaining the above temperature;

c) lowering the temperature of said polyamide to a temperature sufficient to allow the co poly(amide/peptide) to harden; thereby forming a shaped article of said co poly(amide/peptide);

said improvement comprises employing a co poly(amide/peptide) prepared by reacting at least two reactants at least one of which is a polymeric polyamide, an oligomeric polyamide or a polyamide precursor and at least one of which is a polymeric polypeptide, an oligomeric polypeptide or a polypeptide precursor in the presence of an effective amount of one or more aryl phosphoryl azide compounds of the formula:

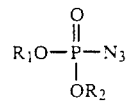

wherein:

$R_1$ is selected from the group consisting of phenyl or phenyl substituted with one or more substituents which are inert under process conditions; and $R_2$ is selected form the group consisting of alkyl, haloalkyl, nitroalkyl, hydrogen, a metal or non-metal cation or $R_1$ substituents.

40. The process in accordance with claim 36 wherein at least one reactant is an oligomeric polyamide or polyamide precursor having a number of repeating units ranging from about 2 to about 50.

41. The process in accordance with claim 36 wherein at least one reactant is an oligomeric polyamide having a number of repeating units ranging from about 2 to about 50, and at least one reactant is an oligomeric polypeptide having a number of repeating units ranging from about 2 to about 50.

42. A process according to claim 1 wherein at least one of said reactants is a polymeric polyamide or oligyomeric polyamide and at least one of said reactants is a polymeric polypeptide or an oligomeric polypeptide.

43. A process according to claim 1 wherein said process is carried out in an organic solvent.

* * * * *

UNITED STATES PATENT AND TRADEMARK OFFICE
CERTIFICATE OF CORRECTION

PATENT NO. : 5,041,497
DATED : August 20, 1991
INVENTOR(S) : Himangshu R. Bhattacharjee It is certified that error appears in the above-identified patent and that said Letters Patent is hereby corrected as shown below:

Column 16, line 51, after poly-Al, it should read "poly-Ala-".

line 54, -Pho- should read "-Phe-".
        line 62, Ala-Lys- should read "poly-Ala-Lys".
        line 62, after --Dopa-- close up space before --Pro-- of the same line.

Column 19, line 1, before --heating-- should read "a) heating".

Signed and Sealed this

Eighth Day of June, 1993

Attest:

MICHAEL K. KIRK

Attesting Officer      Acting Commissioner of Patents and Trademarks